United States Patent
Lanterna et al.

(10) Patent No.: US 9,904,291 B2
(45) Date of Patent: Feb. 27, 2018

(54) METHOD AND SYSTEM TO CONTROL EMERGENCY DESCENT OF AIRCRAFT

(71) Applicant: AIRBUS OPERATIONS (S.A.S.), Toulouse (FR)

(72) Inventors: Florent Lanterna, Toulouse (FR); Thierry Bourret, Toulouse (FR); Jean Muller, Tournefeuille (FR)

(73) Assignee: Airbus Operations (S.A.S.), Toulouse (FR)

(*) Notice: Subject to any disclaimer, the term of this patent is extended or adjusted under 35 U.S.C. 154(b) by 0 days.

(21) Appl. No.: 15/157,176

(22) Filed: May 17, 2016

(65) Prior Publication Data

US 2016/0342159 A1    Nov. 24, 2016

(30) Foreign Application Priority Data

May 19, 2015 (FR) ...................... 15 54472

(51) Int. Cl.
*G05D 1/04* (2006.01)
*G05D 1/06* (2006.01)
(Continued)

(52) U.S. Cl.
CPC ............. *G05D 1/042* (2013.01); *B64C 13/18* (2013.01); *B64C 19/00* (2013.01); *G05D 1/0055* (2013.01); *G05D 1/0088* (2013.01); *G05D 1/0607* (2013.01); *G08G 5/04* (2013.01); *G08G 5/045* (2013.01)

(58) Field of Classification Search
CPC .... G05D 1/042; G05D 1/0055; G05D 1/0088; B64C 19/00; B64C 13/18; G08G 5/04; G08G 5/045
See application file for complete search history.

(56) References Cited

U.S. PATENT DOCUMENTS 6,507,776 B1 * 1/2003 Fox, III ............... G05D 1/0055
                                                        244/180
9,043,051 B1 * 5/2015 Barber .................... B64C 19/00
                                                        701/11
(Continued)

OTHER PUBLICATIONS e-CFR.pdf . Electronic Code of Federal Regulations. Title 14, Chapter I, Subchapter G, Part 121, Subpart K, 121.333. May 18, 2015. Obtained on Jun. 8, 2017 via https://www.ecfr.gov/cgi-bin/text-idx?m=05&d=18&y=2015&cd=20170607&submit=GO&SID=51973dcb904aa7815fc735b83fb9093b&node=se14.3.121_1333&pd=20150519.*

(Continued)

*Primary Examiner* — Rami Khatib
*Assistant Examiner* — Jeffrey Boomer
(74) *Attorney, Agent, or Firm* — Nixon & Vanderhye P.C.

(57) ABSTRACT

A method and a system for controlling an emergency descent of an aircraft. The system (1) includes a unit (2) for detecting an emergency situation, a unit (11) for calculating a usual emergency descent command, a unit (12) for calculating a limited emergency descent command, a selection unit (14) configured for selecting the usual emergency descent command or, if application conditions are met and if the limited descent command is less than said usual emergency descent command and greater than a regulation emergency descent command, selecting the limited emergency descent command, and a unit (4) for application, to the aircraft, of the selected emergency descent command.

16 Claims, 1 Drawing Sheet

(51) Int. Cl.
*B64C 19/00* (2006.01)
*B64C 13/18* (2006.01)
*G05D 1/00* (2006.01)
*G08G 5/04* (2006.01)

(56) References Cited

U.S. PATENT DOCUMENTS

| | | | |
|---|---|---|---|
| 9,242,725 B1* | 1/2016 | Lord | B64C 19/00 |
| 9,620,021 B1* | 4/2017 | Barber | G08G 5/003 |
| 2009/0228161 A1* | 9/2009 | Botargues | G05D 1/0055 |
| | | | 701/11 |
| 2010/0168936 A1* | 7/2010 | Caillaud | G01C 21/00 |
| | | | 701/5 |
| 2011/0224849 A1* | 9/2011 | Braly | G05D 1/0061 |
| | | | 701/9 |
| 2012/0022723 A1* | 1/2012 | Botargues | G05D 1/042 |
| | | | 701/4 |
| 2012/0022724 A1* | 1/2012 | Botargues | G05D 1/101 |
| | | | 701/8 |
| 2012/0022725 A1* | 1/2012 | Botargues | G01O 5/005 |
| | | | 701/10 |
| 2014/0343761 A1* | 11/2014 | Pastor | G05D 1/0607 |
| | | | 701/7 |
| 2014/0365041 A1* | 12/2014 | Deker | G05D 1/0607 |
| | | | 701/4 |

OTHER PUBLICATIONS

French Search Report cited in FR Application No. 1554472, completed Mar. 10, 2016, nine pages.

* cited by examiner

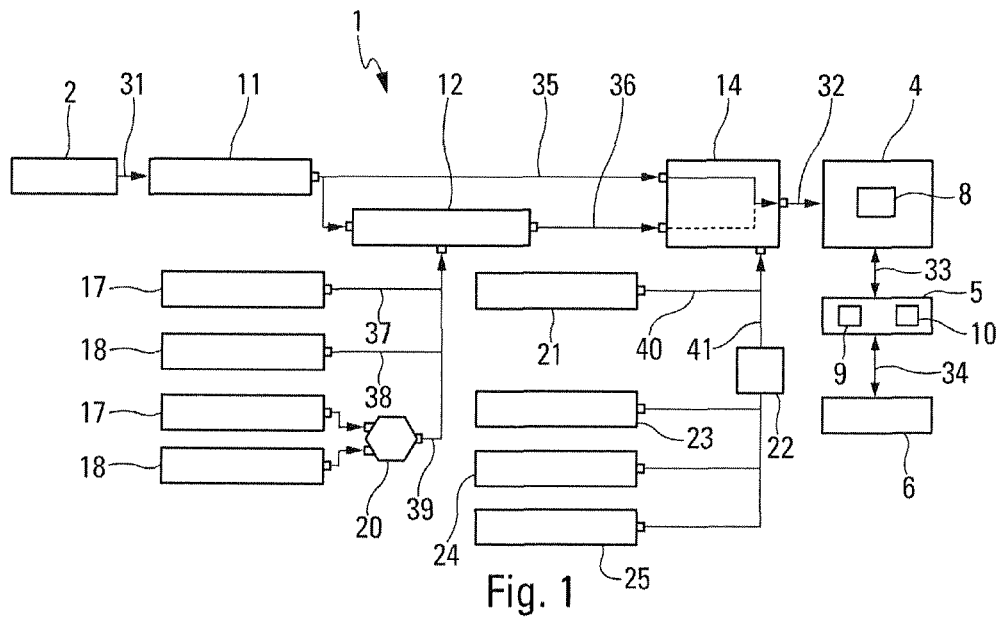
Fig. 1
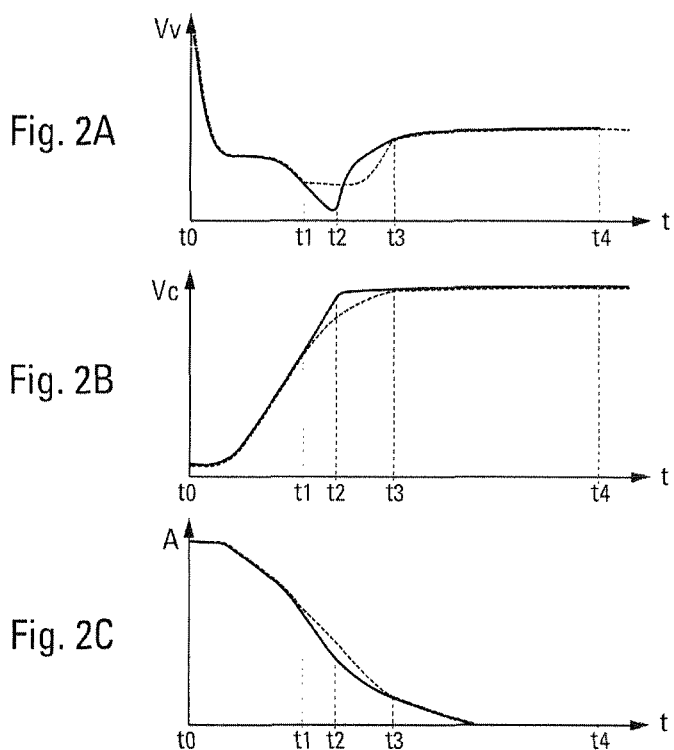
Fig. 2A
Fig. 2B
Fig. 2C

METHOD AND SYSTEM TO CONTROL EMERGENCY DESCENT OF AIRCRAFT

RELATED APPLICATION

This application claims the benefit of French Patent Application 15 54472 filed May 19, 2015, the entirety of which is incorporated by reference.

TECHNICAL FIELD

The present invention relates to a method and a system for controlling an emergency descent of an aircraft and, in particular, an emergency descent of a transport aircraft.

BACKGROUND

It is known that civil transport aircraft must be pressurized because, in cruise flight, an aircraft flies at an altitude which is often higher than 30,000 feet (approximately 9,000 meters), at which the external air has an oxygen content that is too low (and is also too cold and too dry) to be compatible with life. To pressurize the cabin of an aircraft, pressurization systems are installed in the aircraft to maintain a breathable atmosphere on board and in the cabin (which includes at least a cockpit and passenger areas within a fuselage of the aircraft). In particular, international aeronautical regulations demand that any public transport aircraft which flies at an altitude higher than 20,000 feet (approximately 6,000 meters) should be pressurized and that it establishes in the cabin an equivalent altitude which does not exceed 8,000 feet (approximately 2,400 meters) in normal flight.

It can however happen, following a succession of failures or an accident, that the pressurization of the aircraft can no longer be maintained at an acceptable level. An official procedure then obliges the pilot to make the aircraft descend, as quickly as possible, to a breathable altitude of 10,000 feet (approximately 3,000 meters). This procedure is called an emergency descent.

This situation demands a rapid reaction by the crew, particularly in the case of severe depressurization at high altitude, with an accelerated drop in the ambient oxygen content in the cabin.

European and American regulations impose performance criteria that all aircraft have to comply with for carrying out emergency descents. Emergency descent control systems are known which, as a primary function, assist the crew in the management of the emergency descent. These systems make it possible to manage the descent to restore an acceptable pressure. For this purpose, they generate rapid descents which are not optimized, notably with respect to other procedures that the aircraft must follow during this emergency descent phase.

SUMMARY OF THE INVENTION

The invention conceived by the inventors and disclosed herein deals with the optimization of a rapid descent. The invention may be embodied as a method to control an emergency descent of an aircraft, in which the following steps are performed automatically:

A) detect a situation necessitating an emergency descent;
B) generate, e.g., calculate, an emergency descent command;
C) apply the emergency descent command to the aircraft.

The method may also include the following further steps automatically:

calculate a limited emergency descent command, wherein the step B) includes a sub-step of selecting a usual, e.g., standard, emergency descent command or a limited emergency descent command if applicable conditions are met and if the limited descent command is less than the usual emergency descent command and greater than an emergency descent command that would comply with regulation performance, selecting the limited emergency descent command; and apply the selected emergency descent command to the aircraft.

Due to the introduction of a limited emergency descent command, the invention may be applied to optimize an emergency descent, notably not to give the aircraft a descent command that is too high which would result in a non-optimal functioning of other procedures that the aircraft has to follow during this emergency descent phase.

According to different embodiments of the invention, which can be taken together or separately:

A) the limited emergency descent command corresponds to a maximum descent value of the aircraft which allows an anti-collision system of the aircraft to transmit anti-collision or conflict resolution warnings;

B) the limited emergency descent command corresponds to a maximum descent value of the aircraft that the aircraft can withstand in a negative pressure situation;

C) the method comprises an additional step of evaluating the capability of the aircraft to vary the pressure inside the aircraft, the limited emergency descent command is updated periodically based on the most current evaluation of the capability of the aircraft to vary inside pressure;

D) the limited emergency descent command corresponds to a minimum value between a maximum descent value of the aircraft allowing an anti-collision system of the aircraft to transmit anti-collision or conflict resolution warnings and a maximum descent value of the aircraft that the aircraft can withstand in a negative pressure situation;

E) the application conditions are not met if an automatic pilot system of the aircraft is inactive, wherein the method includes an additional step of adaptation of a flight director of the aircraft for guiding the pilot or pilots with respect to the selected emergency descent command;

F) the application conditions are met if an automatic pilot system of the aircraft is active;

G) the application conditions are met if an automatic pilot system of the aircraft is active and if said control method has been activated;

H) the application conditions are met if the control method has been activated by a unit for activation of the control method in the absence of reaction by the crew of the aircraft;

I) a change of mode of the automatic pilot system or of command results in the application conditions no longer being met;

J) the application conditions are met if the control method has been activated by the crew.

The invention may be embodied as a system (control system) for controlling an emergency descent of an aircraft, wherein the system includes:

A) a detection unit for detecting an emergency situation justifying an emergency decent;

B) a calculation unit for calculating an emergency descent command;

C) an emergency descent application unit for application of an emergency descent command to the aircraft.

The control system may further comprise:

D) a limited emergency descent command unit for calculating a limited emergency descent command;

E) a selection unit for selecting either a usual emergency descent command or the limited emergency descent command, wherein the selection unit selects the limited emergency descent command if certain application conditions are met and if the limited emergency descent command is less than the usual emergency descent command and greater than a regulation emergency descent command, and F) an emergency descent command application unit for application, to the aircraft, of the selected emergency descent command.

The selection unit may also be configured for determining if the application conditions are met.

The invention also relates to an aircraft, comprising a control system such as described above.

BRIEF DESCRIPTION OF THE FIGURES

The features of the invention mentioned above, as well as others, will appear more clearly on reading the following description of examples of embodiment, said description being given with reference to the appended drawings, in which:

FIG. 1 is a block diagram of a particular embodiment of a system for controlling an emergency descent of an aircraft; and FIGS. 2A, 2B and 2C each show a graph illustrating curves followed by parameters of the aircraft with and without the system for controlling the descent of the aircraft.

DETAILED DESCRIPTION OF THE INVENTION

FIG. 1 shows a system 1 configured for controlling an emergency descent of an aircraft (not shown), in particular of a transport aircraft, notably when there is a problem of pressurization of the aircraft, when the latter is flying at high altitude, in particular at a cruise altitude. The system is configured to carry out an automatic emergency descent.

The system 1 may be embodied in a computer guidance system for the aircraft. The guidance system may include one or more processors and non-tangible computer memories, The guidance system may receive signals from sensors in the aircraft that, for example, detect the pressurization in the cabin of the aircraft, the altitude and speed (vertical and horizontal speed components) of the aircraft, flight slope (such as rate of ascent or descent of the aircraft), and a potential collision with the ground or another aircraft. The guidance system may output data and commands to other systems in the aircraft, such as the automatic pilot system and alerts and other information to the cockpit instruments. Software may be stored in the computer memories and executed by the processors of the computer guidance systems to perform various functions associated with controlling an emergency descent. The software is described in terms of units and elements in connection with the description of this invention.

The system 1 may comprise the following units (which may be embodied as software implemented logic units):

A) a unit 2 for detecting a situation necessitating an emergency descent (for example during a depressurization of the cabin);

B) a unit 11 for calculating a usual emergency descent command, connected by a link 31 to the detection unit 2;

C) a unit 12 for calculating a limited emergency descent command;

D) a selection unit 14 for selecting the usual emergency descent command or, if application conditions are met and if the limited descent command is less than said emergency descent command and greater than a regulation emergency descent command, selecting the limited emergency descent command; and D) a unit 4 for application of the selected emergency descent command to the aircraft, connected to the selection unit 14 by a link 32 and configured for engaging an automatic emergency descent function. The selection unit 14 is connected to the units 11 and 12 by links 35 and 36.

The selection unit 14 is configured to limit the vertical speed of the aircraft during the emergency descent only in specific operational cases. The standard behavior of this selection unit 14 is to retransmit the usual emergency descent command from the guidance system to other control systems in the aircraft. The selection unit 14 transmits the limited descent command from the guidance system to other control systems in the aircraft, only if specific conditions are encountered as determined by the system 1.

The descent command transmitted by the link 32 to the application unit may be a nose down or nose up command which makes it possible to for the aircraft, e.g., the automatic pilot, to carry out the emergency descent maneuver of the aircraft. Depending on the guidance mode used by the aircraft, the application unit may generate the descent command as a matter of an air speed, a vertical speed or a slope of the aircraft. Depending on the type of aircraft and the architecture of the control loops in the guidance system and other control systems in the aircraft, and according to a particular embodiment, the application unit may generate, for example, vertical acceleration or an attitude variation command.

To retransmit the selected emergency descent command from the guidance system to the aircraft, the unit 4 comprises an element 8, e.g., a set of software instructions, for determining, automatically, a set of vertical commands, on the basis of the selected emergency descent command notably comprising:

A) a target altitude which represents the altitude to be reached by the aircraft at the end of the emergency descent; and B) a target speed which represents the speed, e.g., maximum or minimum speed, that the aircraft must comply with during the emergency descent.

The system 1 also may comprise a disengagement unit 6 which is connected by the intermediary of a link 34 to a control unit 5 and which makes it possible to command a disengagement from an automatic emergency descent function which is being executed.

The automatic emergency descent function thus makes it possible to return the aircraft to a breathable altitude (target altitude) and into a stabilized situation, notably for the purpose of allowing the crew and the passengers to continue the flight until the landing of the aircraft.

When the aircraft is stabilized at the target altitude, at the end of the emergency descent, the crew can communicate and coordinate the continuation of operations with air traffic control. The lateral trajectory followed during the descent is generally maintained at the end of the emergency descent.

The control unit 5 is connected by the intermediary of a link 33 to the application unit 4. The control unit 5 operates in such a way as to complete the longitudinal guidance carried out by the unit 4 with lateral guidance and control of the speed of the aircraft.

The control unit 5 comprises elements 9 for determining, automatically, a set of lateral commands. This set represents a lateral maneuver to be carried out during the emergency descent.

The control unit 5 also comprises conventional elements 10 for guiding the aircraft automatically, during the engagement of an automatic emergency descent function, in such a way that the aircraft simultaneously complies with said set of vertical commands and with said set of lateral commands, and does so until said target altitude is reached. The aircraft may be automatically controlled to maintain the target altitude once the target altitude is reached.

In a particular exemplary embodiment, the selection unit 14 permanently selects a limited emergency descent command.

In a first embodiment, the unit 12 for calculating a limited emergency descent command receives an output, e.g., a command, of the unit 11 for calculating an emergency descent command (as illustrated in FIG. 1). The unit 12 thus adds a limitation to the emergency command outputted by the unit 11. In another embodiment (not shown), the unit 12 for calculating the threshold value is directly integrated in the computing loop of the unit 11.

FIGS. 2A, 2B and 2C show the vertical speed Vv (FIG. 2A), conventional speed Vc (FIG. 2B) and altitude A (FIG. 2C) profiles of an aircraft in emergency descent without limitation (in continuous line) and with limitation (in dotted line). The term limitation means that the limited emergency descent command is used to modify a usual emergency descent, as a function of time t. The vertical speed limitation threshold chosen for this illustration is substantially below the maximum vertical speed that the aircraft can attain by only using its usual vertical guidance loop. The conventional speed may be, for example, the true airspeed of the aircraft.

At a time t0, the application unit 4 applies an emergency descent to cause the aircraft to descent under control of the automatic pilot system for the aircraft. The vertical speed Vv and the altitude A begin to lower whilst the conventional speed Vc increases.

As shown by the dotted line, when the limited emergency decent is selected by unit 12 and starting from a time t1, the vertical speed of the aircraft saturates at a fixed threshold as indicated by the generally horizontal portion of the dotted line in FIG. 2A. During t1 to t2, the altitude reduction due to the aircraft following the limited emergency decent procedure is less pronounced, e.g., lower rate of decent, and the speed gain is less than in the case of an aircraft following the conventional emergency decent.

At a time t2, the vertical speed of the aircraft without a unit 12 for calculating a limited descent command is limited by the speed limit of the aircraft, usually to a value close to its maximum operational speed. Over the interval t2 to t3, the aircraft following the limited descent command, remains established at the saturated vertical speed for a longer time, before also being limited by the maximum operational speed of the aircraft.

Starting from the time t3 up until the time t4, at the end of descent, it can be observed that the persistence of the vertical speed at the saturated threshold obtained with the unit 12 for calculating a limited descent command has made it possible to compensate the altitude difference of the two profiles, as can be seen by the convergence of the solid and dotted lines at t3. Thus, the performance of an emergency descent is not degraded by the addition of the unit 12 and the use of the limited emergency decent command.

According to a particular embodiment, the unit 12 uses a vertical speed limit threshold being equal to a maximum descent value of the aircraft authorizing an anti-collision system of the aircraft to transmit anti-collision and/or conflict resolution warnings.

The system 1 may comprises an element 17, e.g., software instructions, configured for calculating the maximum vertical speed value of the aircraft authorizing an anti-collision system of the aircraft to transmit anti-collision and/or conflict resolution warnings. The element 17 is connected by a link 37 to the unit 12.

An anti-collision system is considered which has, in a usual way, the capability of determining a conflict-resolution warning up to a high vertical speed threshold of an intruding aircraft. Beyond this threshold, the anti-collision system inhibits the transmission of anti-collision/conflict resolution warnings. The system 1, thanks to the element 17, makes it possible to take account of this threshold not to risk not having these warnings during an emergency descent. The implementation of this solution involves checking that it does not prevent the aircraft from achieving the regulation emergency descent performance of the aircraft. This solution makes it possible to carry out a regulation emergency descent, whilst maintaining the capability of warning and therefore of an avoidance maneuver of two aircraft in possible conflict.

According to another embodiment, the unit 12 calculates a limited emergency descent command corresponding to a value of maximum descent of the aircraft that the aircraft can withstand in a negative pressure situation.

The system 1 may include an element 18 configured for calculating the vertical speed threshold value as being equal to a maximum descent value of the aircraft that the aircraft can withstand in a negative pressure situation. The element 18 is connected by a link 38 to the unit 12.

In certain cases and depending on the progress of a rapid descent, the pressure outside of the aircraft can become higher than its internal pressure. This can be the case for an aircraft slightly or not pressurized which is flying with a high rate of descent. If the balancing of the cabin pressure with respect to the increase of the external pressure is not sufficiently fast, according to the sign conventions used, a negative pressure is applied onto the structure of the aircraft and a warning is transmitted to warn the crew above a certain threshold.

To adjust the cabin pressure of an aircraft, pressure regulating valves are installed on board the fuselage of the aircraft. The pressure regulating valves increase or maintain the cabin pressure in the fuselage. Balancing valves in case of negative pressure are also present on board the fuselage. These various types of valves generally have redundancy. On certain aircraft, the pressure regulating valves can contribute to the rebalancing of the cabin pressure in the case of negative pressure. The provisioning of this system, through the number of valves of different types, is notably determined as a function of the maximum rates of descent that can be adopted by the aircraft, in such a way that these maneuvers cannot give rise to structural damage related to pressure differentials that are too large.

The system 1, using information on vertical speed form element 18 can reduce the number of valves required for balancing the internal pressure of the aircraft with respect to the atmospheric pressure. This approach must remain compatible with the emergency descent performance imposed by the regulations. The element 18 can also dynamically adjust the vertical speed limit threshold of the aircraft as a function of possible failures detected at the level of the pressure regulating valves.

In a complementary embodiment, it is possible to use the minimum vertical speed limit value of the elements 17 and 18 and to select the minimum vertical speed to take advantage of the previously described properties. The system 1 comprises for this purpose a selector 20 which selects the minimum value (in absolute value) of vertical speed limit of the elements 17 and 18.

The selector 20 is connected by a link 39 to the unit 12.

That the system 1 applies the limited vertical speed descent command, it is necessary that conditions for application of this limitation are met. These application conditions are not met if a system 21 for detection of the state of the automatic pilot system of the aircraft detects that the automatic piloting is inactive. In this situation, the flight director of the aircraft is adapted for guiding the pilot in such a way as not to exceed the limited emergency descent command. This first solution can make it possible to indicate to the pilot, through his primary display instruments and his flight director, the maneuver to be carried out to comply with the properties of the elements 17 and 18. This first solution can be advantageous if the authority and the maximum descent rates that can be reached in manual piloting are higher than those attainable in automatic piloting.

On the contrary, the application conditions are met if the system 21 detects that the automatic piloting is active. The system 21 is connected to the selection unit 14 by a link 40.

Thus, the limited descent command is chosen by the selection unit 14 if the automatic pilot system is active. It is considered in this case that the crew leaves it totally to the automatic pilot system to take account of the properties of the elements 17 and 18. When the crew resumes manual control of the aircraft, it is fully capable of monitoring and reacting as a function of its environment, and the vertical speed is then no longer limited.

In another embodiment, the application conditions are met if the system 21 detects that the automatic piloting is active and if a unit 22 for detection of the activation of the system 1 detects that the system 1 has been activated. The unit 22 is connected to the selection unit 14 by the intermediary of a link 41.

Thus, the limited descent command is chosen by the selection unit 14 if the automatic pilot system is active and if the emergency descent assistance function has been activated by an on-board system or by the crew. It is considered in this case that the crew leaves it totally to the emergency descent assistance function of the automatic pilot system to take account of the properties of the elements 17 and 18. If it is not using the emergency descent assistance function, it is on the contrary considered fully capable of monitoring and reacting as a function of its environment and the vertical speed is then no longer limited.

In another embodiment complementary to the preceding one, the application conditions are met if said system 1 has been activated by an automatic activation system 23 in the absence of reaction by the crew of the aircraft.

Thus, the limited descent command is chosen by the selection unit 14 if the automatic pilot system is active, if the emergency descent assistance function has been activated and that this activation results in a system action in the absence of reaction by the crew. The crew being potentially unconscious, the system 1 uses the properties of the elements 17 and 18.

In a complementary embodiment, a change of mode of the automatic pilot system or of command is detected by a unit 24 and results in the application conditions no longer being met.

Thus, if an action by the crew is detected during the maneuver, for example a change of mode of the automatic pilot system or a change of command, the vertical speed limitation is cancelled.

In another embodiment, the application conditions are met if said system 1 has been activated by the crew by the intermediary of an activation unit 25.

Thus, the limited descent command is chosen by the selection unit 14 if the automatic pilot system is active, if the emergency descent assistance function has been activated and that this activation results solely from a voluntary action by the crew. In this case it is considered that the crew leaves it totally to the emergency descent assistance function of the automatic pilot system to take account of the properties of the elements 17 and 18 and that, if it is unconscious, it is preferable not to limit the descent speed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for controlling an emergency descent of an aircraft, said method comprising:
   automatically detecting a situation necessitating an emergency descent;
   automatically calculating a default emergency descent command;
   automatically calculating a limited emergency descent command that corresponds to a minimum descent value achieved by selecting between a maximum descent value of the aircraft allowing an anti-collision system of the aircraft to transmit anti-collision or conflict resolution warnings and a maximum descent value of the aircraft at which the aircraft can safely withstand a situation where external pressure exceeds internal pressure, wherein the maximum descent value of the aircraft at which the aircraft can safely withstand the situation where the external pressure exceeds the internal pressure is determined as a function of failure detected at pressure regulating valves that balance the internal pressure with respect to the external pressure;
   automatically selecting one of the default emergency descent command or the limited emergency descent command when certain conditions are met, wherein the limited emergency descent command is selected when a descent rate of the limited emergency descent command is less than a descent rate of the default emergency descent command and greater than a descent rate of an emergency descent command complying with regulation performance; and
   automatically applying a selected one of the default emergency descent command to the aircraft and the limited emergency descent command to automatically control an emergency descent of the aircraft;

wherein the method is performed with at least one processor and at least one memory storing instructions that cause the at least one processor to execute the steps.

2. The method as claimed in claim 1, further comprising evaluating a capability of the aircraft to withstand pressure variations within a cabin of the aircraft and updating the limited emergency descent command based on the evaluation of the capability of the aircraft.

3. The method as claimed in claim 1, wherein the certain conditions include whether an automatic pilot system of the aircraft is active, wherein, if the automatic pilot system is inactive, the method further comprises generating flight guidance information corresponding to the selected emergency descent command by a flight guidance system and presenting the flight guidance information on a flight display to a pilot of the aircraft.

4. The method as claimed in claim 1, wherein the certain conditions include that an automatic pilot system of the aircraft is active.

5. The method as claimed in claim 4, wherein the certain conditions are met if an automatic pilot system of the aircraft is active.

6. The method as claimed in claim 5, wherein the certain conditions are not met if an automatic pilot system is deactivated from automatic piloting of the aircraft.

7. The method as claimed in claim 6, wherein a change of mode of the automatic pilot system results in the certain conditions no longer being met.

8. The method as claimed in claim 5, wherein a determination is made as to whether the certain conditions are met based on whether an aircrew has activated the automatic pilot system.

9. The method as claimed in claim 1, further comprising automatically evaluating a capability of the aircraft to vary the pressure inside the aircraft and updating the limited emergency descent command accordingly.

10. A system for controlling an emergency descent of an aircraft, said system comprising:
at least one processor and at least one memory storing instructions that when executed by the at least one processor cause the system to:
detect an emergency situation necessitating an emergency descent of the aircraft;
calculate a default emergency descent command;
calculate a limited emergency descent command that corresponds to a minimum descent value achieved by selecting between a maximum descent value of the aircraft allowing an anti-collision system of the aircraft to transmit anti-collision or conflict resolution warnings and a maximum descent value of the aircraft at which the aircraft can safely withstand a situation where external pressure exceeds internal pressure, wherein the maximum descent value of the aircraft at which the aircraft can safely withstand the situation where the external pressure exceeds the internal pressure is calculated as a function of failure detected at pressure regulating valves that balance the internal pressure with respect to the external pressure;
select the default emergency descent command or the limited emergency descent command when certain conditions exist, wherein the limited emergency descent command is selected when a descent rate of the limited emergency descent command is less than a descent rate of the default emergency descent command and greater than a descent rate of a regulation emergency descent command; and
apply the selected one of the default emergency descent command and the limited emergency descent command to operate the aircraft.

11. The system as claimed in claim 10, wherein the system is configured to select the emergency descent command or the limited emergency descent command if the certain conditions are met.

12. An aircraft comprising the system as claimed in claim 10.

13. The system as claimed in claim 10, wherein the at least one processor and at least one memory store instructions that when executed by the at least one processor cause the system to automatically evaluate a capability of the aircraft to vary the pressure inside the aircraft and update the limited emergency descent command accordingly.

14. A method for controlling an emergency descent of an aircraft, comprising the following automatically performed steps:
detecting a situation associated with the aircraft necessitating an emergency descent;
determining a default emergency descent command;
applying the default emergency descent command to the aircraft to control the aircraft during an emergency descent;
calculating a limited emergency descent command that corresponds to a minimum descent value achieved by selecting between a maximum descent value of the aircraft allowing an anti-collision system of the aircraft to transmit anti-collision or conflict resolution warnings and a maximum descent value of the aircraft at which the aircraft can safely withstand a situation where external pressure exceeds internal pressure, wherein the maximum descent value of the aircraft at which the aircraft can safely withstand the situation where the external pressure exceeds the internal pressure is calculated as a function of failure detected at pressure regulating valves that balance the internal pressure with respect to the external pressure;
selecting the limited emergency descent command to be used instead of the emergency descent command based on a determination that at least one certain condition is met and that the limited emergency descent command is less, in terms of vertical speed of the aircraft, than the default emergency descent command and greater than an emergency descent command complying with regulation performance; and
applying the limited emergency descent command instead of the default emergency descent command in response to the selection of the emergency descent command,
wherein the method is performed with at least one processor and at least one memory storing instructions that cause the at least one processor to execute the steps.

15. The method as claimed in claim 14, wherein the certain condition includes whether an automatic pilot system of the aircraft is active, wherein, if the automatic pilot system is inactive, the method further comprises generating flight guidance information corresponding to the selected emergency descent command and presenting the flight guidance information on a flight display to a pilot of the aircraft.

16. The method as claimed in claim 14, further comprising evaluating a capability of the aircraft to vary the pressure inside the aircraft and updating the limited emergency descent command accordingly.

* * * * *